(12) United States Patent
Fischer et al.

(10) Patent No.: US 9,868,405 B1
(45) Date of Patent: Jan. 16, 2018

(54) BED LINER FASTENING SYSTEM AND METHOD

(71) Applicant: Caterpillar Inc., Peoria, IL (US)

(72) Inventors: Tony Fischer, Peoria, IL (US); Qiaoyu Lu, Peoria, IL (US); Aaron K. Amstutz, Peoria, IL (US); Dean W. Walters, Peoria, IL (US); Kristina Melvin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/217,762

(22) Filed: Jul. 22, 2016

(51) Int. Cl.
*B62D 33/00* (2006.01)
*B60R 13/01* (2006.01)

(52) U.S. Cl.
CPC ........ *B60R 13/01* (2013.01); *B60R 2013/018* (2013.01)

(58) Field of Classification Search
CPC .............. B60R 21/205; B60R 21/2338; B60R 21/2346; B60R 2021/0407; B60R 13/01; A47C 27/087; A47C 27/085; B01J 8/0492; B60P 7/15; C08L 2666/04
USPC ................................................ 296/39.2, 39.1
See application file for complete search history.

(56) References Cited

U.S. PATENT DOCUMENTS

| | | | | | |
|---|---|---|---|---|---|
| 3,363,933 A | * | 1/1968 | Wilson | ..................... | B60P 1/286 105/261.2 |
| 3,578,375 A | * | 5/1971 | Finefrock | ................ | B60P 1/286 105/422 |
| 3,652,123 A | * | 3/1972 | Speers | ..................... | B60R 13/01 296/183.1 |
| 3,912,325 A | * | 10/1975 | Sudyk | ..................... | B60R 13/01 105/423 |
| 3,953,950 A | * | 5/1976 | Sudyk | ..................... | B60R 13/01 404/68 |
| 4,029,354 A | * | 6/1977 | Valeri | ..................... | B60P 1/286 105/423 |
| 4,902,038 A | | 2/1990 | Grover | | |
| 5,131,709 A | * | 7/1992 | Spica | ........................ | B60R 9/00 105/423 |
| 5,803,531 A | * | 9/1998 | Nielsen | ................... | B60R 13/01 105/422 |
| 5,851,043 A | * | 12/1998 | Moutrey | ................. | B60P 1/286 296/39.2 |
| 6,000,741 A | * | 12/1999 | Reynolds | ................ | B60R 13/01 296/39.2 |
| 6,007,132 A | * | 12/1999 | Burg | ...................... | B60R 13/01 296/39.1 |

(Continued)

*Primary Examiner* — Kiran B Patel
(74) *Attorney, Agent, or Firm* — Leydig, Voit & Mayer, Ltd.

(57) ABSTRACT

A bed liner system for use in a bed floor of a material hauling machine includes a lower panel that is attachable to the bed floor. The lower panel includes a first plate having a first flange, a first central opening and two first central slots disposed, one each, on either side of the first central opening. The bed liner system further includes an upper panel that is attachable to the lower panel. The upper panel includes a top plate having a second flange having a second central opening and two second central slots disposed that are aligned with corresponding features of the first flange such that a block having a top flange and a bottom flange connected by a web is insertable through the first and second central openings and slidable through one each of the two first and second central slots.

20 Claims, 7 Drawing Sheets

(56) References Cited

U.S. PATENT DOCUMENTS

| | | | | |
|---|---|---|---|---|
| 6,129,409 | A * | 10/2000 | D'Amico | B60R 13/01 |
| | | | | 296/183.2 |
| 6,174,014 | B1 * | 1/2001 | Hook | B60P 1/286 |
| | | | | 296/183.2 |
| 6,194,080 | B1 * | 2/2001 | Stickling | E02F 9/2841 |
| | | | | 172/772 |
| 6,824,851 | B1 | 11/2004 | Locher et al. | |
| 8,052,193 | B2 * | 11/2011 | Liebert | B60R 13/01 |
| | | | | 296/183.1 |
| 8,708,391 | B2 | 4/2014 | Dunn et al. | |
| 9,216,680 | B2 * | 12/2015 | Hagenbuch | B60P 1/286 |
| 9,308,875 | B2 * | 4/2016 | Burstrom | B60P 1/286 |
| 2001/0012812 | A1 | 8/2001 | Spengler | |
| 2011/0006562 | A1 | 1/2011 | Campbell et al. | |
| 2011/0181067 | A1 * | 7/2011 | Dunn | B60P 1/286 |
| | | | | 296/39.2 |
| 2014/0312642 | A1 * | 10/2014 | Amstutz | B60P 1/286 |
| | | | | 296/39.2 |
| 2014/0327265 | A1 * | 11/2014 | Burstrom | B60R 13/01 |
| | | | | 296/39.2 |
| 2015/0061311 | A1 * | 3/2015 | Natarajan | B60R 13/01 |
| | | | | 296/39.2 |
| 2016/0194035 | A1 * | 7/2016 | Lu | B62D 25/2072 |
| | | | | 296/39.2 |

* cited by examiner

BED LINER FASTENING SYSTEM AND METHOD

TECHNICAL FIELD

The present disclosure relates generally to bed liners for material hauling machines and, more particularly, to a fastening and retention method and system or a machine bed liner system.

BACKGROUND

Machines having beds for hauling bulk or aggregate material are known. In general, liners for the beds of such machines have been used to prevent damage and wear to the machine bed, especially when hauling abrasive cargo such as earth, gravel and the like. In certain known applications, bed liners are permanently installed in a truck's bed, for example, by spraying a coating onto the internal surfaces of the bed that contact the cargo. In other applications, removable and/or replaceable liners are installed.

One previously proposed bed liner is described in U.S. Pat. No. 8,708,391, which describes a system for providing replaceable wear surfaces on abrasive-material handling-equipment. The system includes at least one replaceable surface structured and arranged to provide a replaceable surface onto a bed of a hauling vehicle. The replaceable surface includes at least one wear-resister element that resists wear. The replaceable surface includes at least one magnet that magnetically attaches the replaceable surface to a bed of the hauler. While the magnetically attachable, removable liner may be at least partially effective in preventing damage and wear to the bed liner, it is relatively complex and expensive to construct. Moreover, the liner that includes magnets can create stress concentrators in the liner, which can lead to premature wear and failure of the attachment arrangement of the liner.

SUMMARY

In one aspect, the disclosure describes a bed liner system for use in a bed floor of a material hauling machine. The bed liner system includes at least one lower panel that is attachable to the bed floor. The at least one lower panel includes a first plate having a first flange. The first flange includes a first central opening and two first central slots disposed, one each, on either side of the first central opening. The bed liner system further includes at least one upper panel including a top plate. The top plate has a second flange including a second central opening and two second central slots disposed, on each, on either side of the second central opening. The bed liner system further includes a block having a top flange and a bottom flange connected by a web. When the at least one upper panel is engaged with the at least one lower panel in the bed liner system, the second flange is disposed over the first flange, the first and second central openings are aligned, and the two first central slots are aligned with the two second central slots such that the block is insertable through the first and second central openings and slidable through one each of the two first and second central slots such that the web occupies one of the two first and second central slots to secure the at least one upper panel to the at least one lower panel.

DETAILED DESCRIPTION

Figure 1:
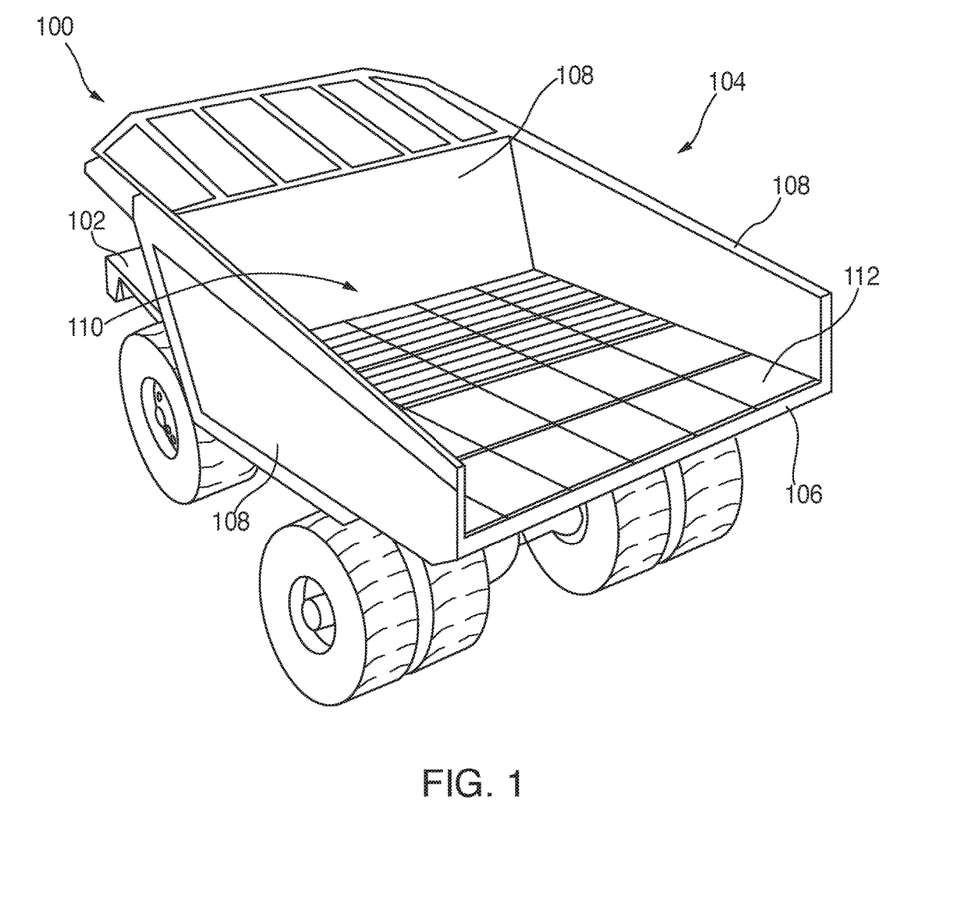
FIG. 1 is a schematic view of a hauling machine having a bed for hauling material and a bed liner disposed in the bed in accordance with the disclosure.

Aspects of the disclosure will now be described in detail with reference to the drawings, wherein like reference numbers refer to like elements throughout, unless specified otherwise. FIG. 1 shows a schematic view of a machine 100 having a bed liner in accordance with the disclosure. The machine 100 shown in the illustrated, exemplary embodiment is a mining truck, but other machines may use a bed liner in accordance with the present disclosure. For example, a liner may be used to line the work implement or a bucket of a wheel loader or excavator, the blade of a bulldozer or motor grader, and the like. In general, the term "machine" may refer to any machine that performs some type of operation associated with an industry such as mining, construction, farming, transportation, marine or any other industry known in the art. Accordingly, the machine 100 may be an earth-moving machine, such as a wheel loader, excavator, dump truck, backhoe, motor-grader or the like.

In the embodiment shown, the machine 100 includes a frame 102. The frame 102 is configured to mount and/or support various components of the machine 100 including, but not limited to, an engine system, a transmission system, an operator cabin and the like, all of which are known and are not described in further detail herein for simplicity. The frame 102 supports a bed 104, which in the illustrated embodiment is arranged to pivot with respect to the frame 102 such that material unloading can be effected. The bed 104 defines a volume therein for holding material loaded. The volume is defined by a floor portion and walls surrounding the floor on three sides. A rear portion of the bed is open, as shown, but can alternatively have a door or gate in the known fashion. The bed is also open from the top for loading of loose or aggregate material therein.

In this, generally familiar configuration, the bed 104 is loaded from the top by a loader (not shown) in the known fashion. During a loading operation, material may be dropped into the internal volume of the bed from the top when a bucket full of material is tipped to unload material into the internal cavity. As can be appreciated, the first few initial loads of material that are deposited into the bed will fall a maximum height with respect to the floor of the bed, and will collide with the floor as they pile and accumulate therein with successive bucket loads being deposited. Additionally, when the bed 104 is tipped for unloading or, as is the case with other known truck systems, when a blade pushes material off the bed and through the back of the machine, the material in the bed will drag along the floor of the bed until it falls off the end of the bed.

As can be appreciated, the nature of the loading and unloading material from the bed may cause damage and wear to the material of the floor of the bed, and also the lower portions of the surrounding bed walls. In at least these areas, a liner having replaceable panels may be added. In the present disclosure, the replaceable panels are configured to both protect the native bed material from wear and damage, and also to cushion impacts of material onto the bed, which with prolonged use will also increase the service life of the various machine components of the machine. In addition, depending on the bed material, friction may also be reduced for material dragging along the bottom of the bed, which can reduce weathering and corrosion in the native bed material. The bed 104 is thus configured to receive and contain material as the machine transports the material from one location to another. The bed 104 includes a floor 106 and a number of side walls 108. The floor 106 and the side walls 108 are disposed in a manner such that a hollow, load receiving volume 110 is formed therein. In other embodiments, the bed 104 may include only the floor 106 and the side walls 108 may be omitted as required in case of hauling machinery or equipment having a size larger than that of the floor 106.

The floor 106 includes a liner system 112 installed thereon. The liner system 112 is configured to provide a wear surface over the floor 106, as described above. More specifically, the liner system 112 acts as an intermediate surface between the floor 106 and material (not shown) received on the bed 104, to reduce or eliminate erosion of the native material of the floor 106 during material loading and unloading. The liner system 112 described herein is advantageously a modular system that includes permanent and replaceable, wear components such that, when the liner system 112 becomes worn during use, certain portions of the liner system 112 that come in regular contact with the materials hauled by the machine 100 can be replaced to overhaul or renew the liner system 112 with minimal cost and effort.

Figure 2:
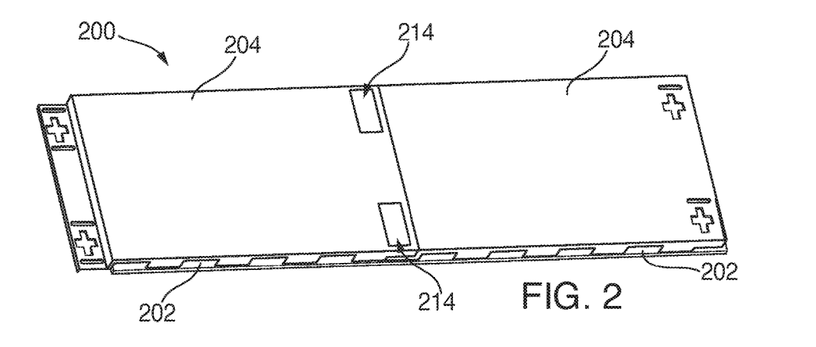
FIG. 2 is an outline view of a bed liner system in accordance with the disclosure.

FIG. 2 illustrates a module 200 of the liner system 112. As can be seen, the module 200 includes various components in a grouping, which can be duplicated to cover a majority of a floor 106 in a machine 100 irrespective of the size of the floor 106. In other words, while a particular grouping of components is shown for the module 200, more than one module 200 can be connected and combined to produce the liner system 112 on a machine of any size and configuration. Moreover, while the components that make up the module 200 are shown as flat, curved and/or contoured components can also be used to accommodate different geometries of machine systems that can be protected by a liner including, but not limited to, loader or excavator buckets, earthmoving machine blades and the like.

The module 200 as shown, is made up of, essentially, two panels, a lower panel 202 and an upper panel 204. Each of the upper and lower panels 202 and 204 forms longitudinal channels 206 that include longitudinal channels 208 and a transverse channel 210 that surround lugs 212. The channels and lugs are arranged such that the upper and lower panels 202 and 204 engage in an interlocking fashion where, for example, lugs 212 in the lower panel 202 are disposed within channels in the upper panel 204 and vice versa when an upper panel 204 is disposed on top of and has engaged a corresponding lower panel 202. This engagement resists a shear motion along a plane parallel to the major dimensions of the panels when the panels are installed in the liner system 112 to discourage or prevent relative sliding motion between the panels, for example, when a bucket or bed is tipped, or when material is pushed off the bed by a blade during an unloading operation of the machine 100. The system may be installed in any appropriate or desired orientation, including at an angle, relative to the direction of material unloading.

To prevent detachment of the upper panel 204 from the lower panel 202, the module 200 further includes engagement arrangements 214 having keyed features, as will be described hereinafter. In the illustrated embodiment in FIG. 2, six engagement arrangements 214 are shown, arranged in three pairs of two, with the two central ones shown with engagement components therein to attach, in the middle, the two upper panels 204 shown in the figure to the two lower panels 202, which are also shown in the figure.

Figure 3:
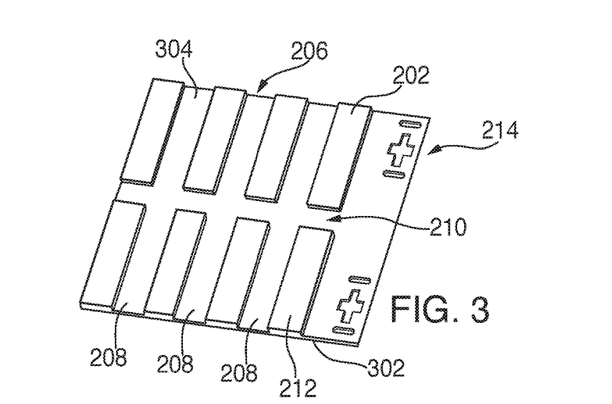
FIG. 3 is an outline view of a lower bed liner panel in accordance with the disclosure.

A lower panel 202 is shown removed from the liner for illustration in FIG. 3. The lower panel 202 includes a base plate 302 that has a uniform thickness, T, along its generally rectangular shape. The lugs 212, are arranged on top of the base plate 302 such that the troughs of the channels 208 and 210 coincide with a top surface 304 of the base plate 302. In the embodiment shown, the height or thickness of the lugs 212 is about equal to the thickness T of the base plate 302, which makes the entire thickness of the lower panel 202 from the bottom of the base plate 302 to the top surface of the lugs 212 to about 2T, but other dimensions may be used. Moreover, the lugs 212 and base plate 302 are integrally formed in a single body, which can be molded out of rubber, polyurethane or another material of the type having at least some elastic properties. In the illustrated embodiment, a Shore A hardness of the lower panel 202 is about 90, but any hardness in the range between Shore A 50 and Shore D 60 may be used. The base plate 302 forms two engagement arrangement 214 features on one side extension or side flange thereof that is free of lugs 212.

Figure 4:
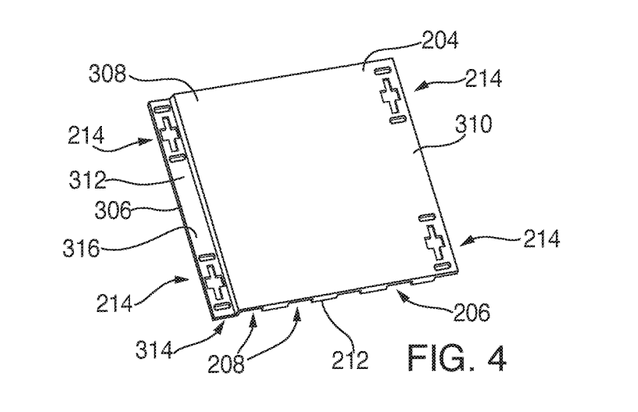
FIG. 4 is an outline view of an upper bed liner panel in accordance with the disclosure.

An upper panel 204 is shown removed from the liner for illustration in FIG. 4. The upper panel 204 includes a top plate 306 having a top surface 308 that also has a uniform thickness T along its generally rectangular shape. The lugs 212 are arranged on the bottom surface of the top plate 306 such that the troughs of the channels 208 and 210 coincide with a bottom surface of the top plate 306. In the embodiment shown, the height or thickness of the lugs 212 is about equal to the thickness T of the top plate 306, which makes the entire thickness of the upper panel 204 from the top of the top plate 306 to the bottom surface of the lugs 212 to about 2T, but other dimensions may be used. Moreover, the lugs 212 and top plate 306 are integrally formed in a single body, which can be molded out of rubber, polyurethane or another material of the type having at least some elastic properties. In the illustrated embodiment, a Shore A hardness of the upper panel 204 is about 70, but any hardness in the range between 50 and 95 may be used.

The upper panel 204 forms four engagement arrangement 214 features on side extensions or side flanges thereof, which are free of lugs 212 and which are disposed along different, parallel planes for connecting adjacent panels together, as will be described hereinafter. More specifically, a first flange 310 has a thickness T and has a top side that is coplanar with the top surface 308 to, essentially, form an extension of the top plate 306. A second flange 312 is flat, rectangular and has a thickness T, and has a bottom side 314 that is coplanar with the bottom surfaces of the lugs 212 such that a top side 316 of the second flange 312 is offset from the top surface 308, but parallel thereto, by a distance that is about equal to the thickness T.

As can be appreciated, while the lower panel 202 and the upper panel 204 are made of similar materials, it is contemplated that they may have the same or different properties, especially with respect to material hardness, coefficient of friction, and abrasion resistance. In one embodiment, the top panel may be constructed by overlaying multiple layers of elastomeric material, where a top layer of the top panel (roughly thickness T) will be one color and the bottom portion, including the mounting blocks, will be molded in a different color. In this way, exposure of the differently colored lower layer will be readily evident to the machine operator and will communicate excessive wear of the upper panel, at least locally, to facilitate its timely removal and replacement. Alternatively, the top panel may be molded in various layers of differently colored material to indicate the degree of wear of the panel. In one contemplated method for manufacture, the various layers can be made by a two-step or multi-step casting of polyurethane or co-molding rubber. Additionally, the top portion, that is primarily responsible for withstanding wear during usage, may be formulated with additives to improve the abrasion resistance and lower the coefficient of friction.

In this respect, in the illustrated embodiment, the lower panel 202 is made of a "harder" material, while the upper panel 204 is made of a "softer" material, i.e., different Shore A or durometer hardness, but still the same base material type such as rubber, polyurethane and the like. The differences in material hardness, while optional, are intended to facilitate replacement of various components during service, and also to protect the bottom layer of the liner from damage under extreme loading conditions, where the upper layer of "softer" material acts to absorb at least some of the impact loading of material being dropped onto the liner during loading.

Figure 5:
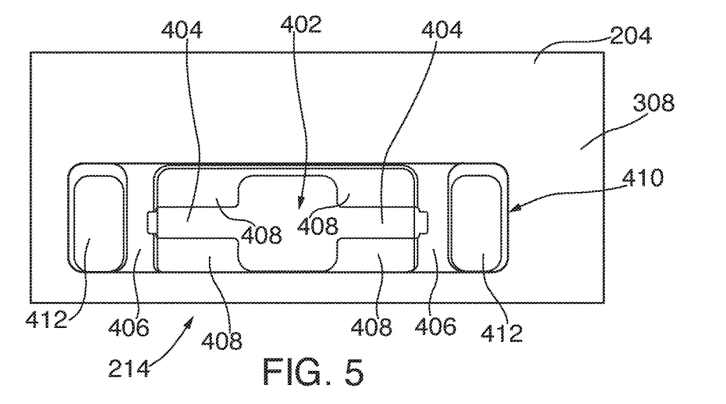
FIG. 5 is an enlarged detail view of a connection port in a bed liner panel in accordance with the disclosure.

An enlarged, detail view of a portion of an engagement arrangement 214, as formed in a first flange 310 of an upper panel 204, is shown in FIG. 5. As shown, the portion of the engagement arrangement 214 defines one of three such arrangements that are aligned when the upper and lower panels 202 and 204 are secured to one another. As can be gleaned from FIG. 2, for example, an engagement arrangement includes features that are aligned on adjacent panels from the flange of a lower panel 202, the second flange 312 of an adjacent upper panel 204, and the first flange 310 of an upper panel 204, which in the illustrated embodiment is disposed in the middle, in that order, going in a direction from a base plate 302 towards a top plate 306. While in one embodiment these three layers may have the same thickness T, as described above, they can also have different thicknesses as shown, for example, in the embodiments shown in FIGS. 14 and 15.

Each of the three, aligned engagement arrangements 214 includes openings that are generally aligned. As shown in FIG. 5, and also in reference to FIGS. 14 and 15, an engagement arrangement 214 includes a central opening 402 having a generally rectangular shape with rounded corners. The central opening 402 is open to two central slots 404 disposed, one each, on either side of the central opening 402. In the illustrated embodiment, the central slots 404 are collinear and extend from the middle of the central opening 402 away from each other in a direction parallel to the longitudinal channels 206 (FIG. 4), but other orientations can be used. Each central slot terminates at a stop wall 406 and has ledges 408 disposed on either side of the central slot 404 and extending between the central opening 402 and the stop wall 406. The stop walls 406 are recessed relative to the top surface 308 and are disposed in a well 410.

Figure 14:
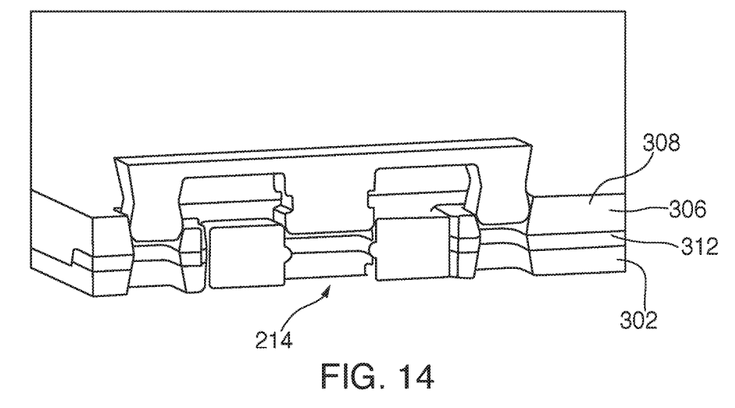
FIGS. 14 and 15 are sectional views through a bed liner panel connection in accordance with the disclosure.
Figure 15:
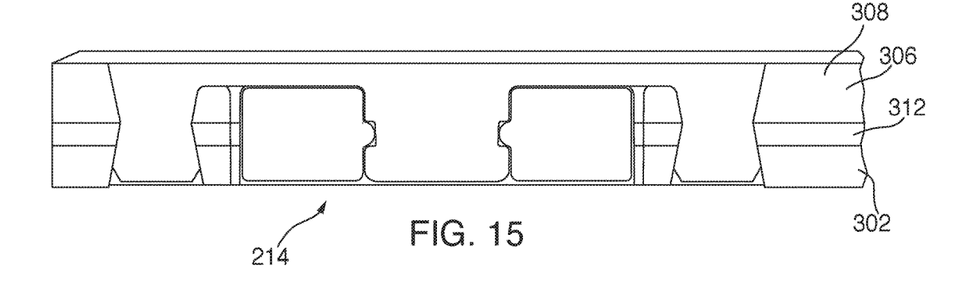

On a side opposite the central slot 404 relative to the stop wall 406, but still within the well 410, is a tapered opening 412 having a generally rectangular shape whose cross sectional area gradually or, as shown, linearly, reduces in a downward direction. As can be seen from FIGS. 14 and 15, the central opening 402, central slots 404, stop walls 406, ledges 408 and tapered openings 412, which are described above relative to a first flange 310 of an upper panel 204, are essentially duplicated in the lower panels 202 and also in the second flange 312 of the upper panel 204 but with some minor differences. For example, where the taper in the tapered openings 412 in the first flange 310 is inward in a downward direction, the taper in the tapered openings 412 in the second flange 312 and in the lower panel 202 is outward in the downward direction such that the tapered openings 412, when the upper and lower panels 202 and 204 are assembled, has a generally hourglass shape when viewed in cross section along a plane that is perpendicular to the upper and lower panels 202 and 204. There is also no well 410 in the lower panel 202 and the second flange 312. These features are best seen in FIGS. 14 and 15.

Figure 6:
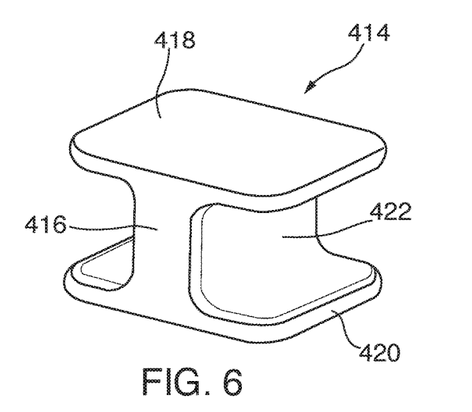
FIGS. 6 and 7 are outline views from different perspectives of a connection block in accordance with the disclosure.

For connecting adjacent panels, each engagement arrangement 214 further includes two blocks 414. A block 414 is shown from two different perspectives in FIGS. 6 and 7. In reference to these figures, the block 414 includes a body 416. The body 416 is generally shaped as a segment of an I-beam, which includes a top flange 418 and a bottom flange 420 connected by a web 422. At least one nub or protrusion 424 is formed on one end of the web 422 about midway between the top and bottom flanges 418 and 420, but it is contemplated that an additional nub or protrusion may be formed on the opposite side of the web. The body 416 may be made of an elastic material and, in the illustrated embodiment, is made from the same, "harder" material as the lower panel 202 (FIG. 3), as previously described, but they can also be made from the "softer" material as the upper panel 204, or any other material, for example, polyurethane, rubber, plastic, composite material, metal and the like.

Figure 7:
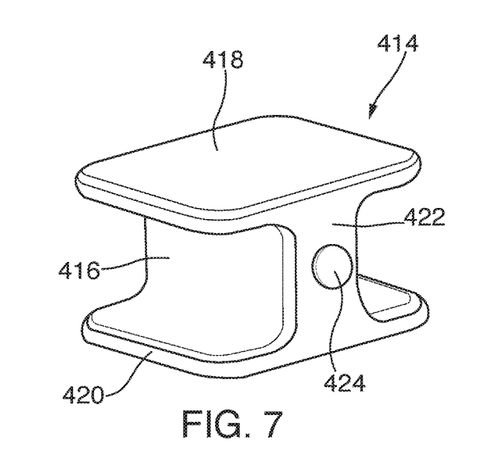
Figure 8:
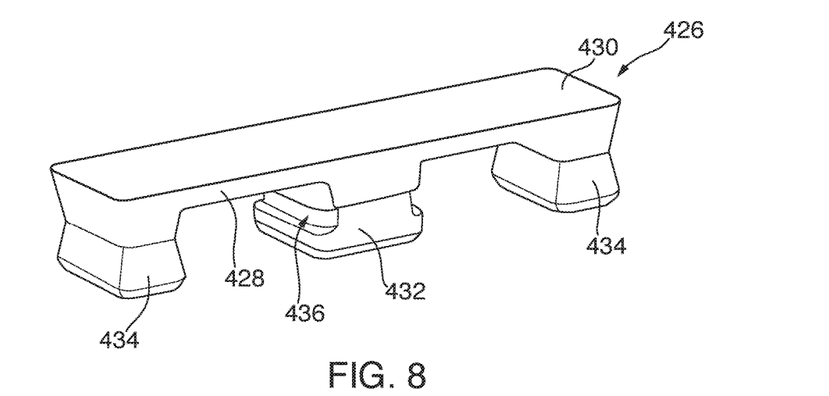
FIGS. 8 and 9 are outline views from different perspectives of a connection pad in accordance with the disclosure.
Figure 9:
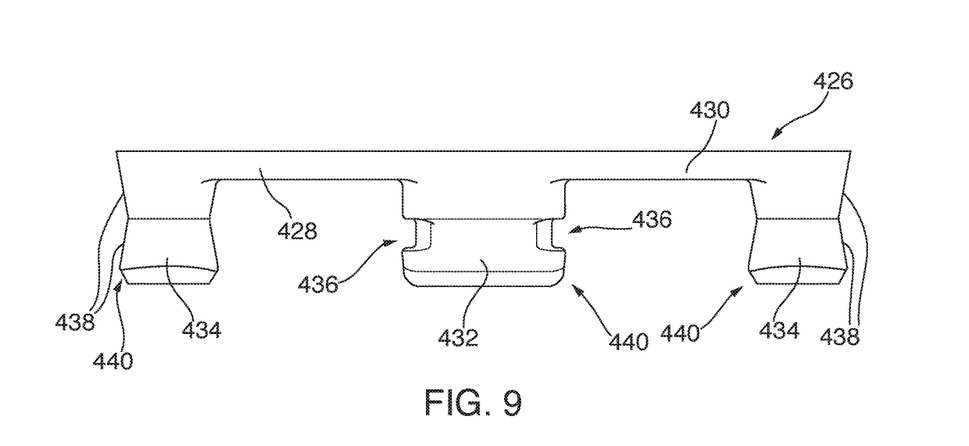

For locking the blocks 414 in place, each engagement arrangement 214 further includes a pad 426, which is shown from two different perspectives in FIGS. 8 and 9. The pad 426 includes a body 428 that forms a top shelf 430, a central leg 432, and two end legs 434. The top shelf 430 has a generally rectangular, elongate shape that corresponds to the size, shape and depth of the well 410 (FIG. 5). The central leg 432 includes two channels 436 that extend transversely relative to the longitudinal dimension of the top shelf 430 and are positioned such that they correspond to a height dimension of the protrusion 424 (FIG. 7). Each of the end legs 434 is tapered inwardly and then outwardly as it extends away from the top shelf 430 to provide an hourglass shape that generally corresponds to the shape of the tapered openings 412 (FIG. 5). To that end, an inwardly and then outwardly tapered surface 438 surrounds each end leg 434. At an end of each central leg 432 and two end legs 434 is a chamfered surface 440, which facilitates insertion of the pad 426 into the engagement arrangement 214. The body 428 may be made of an elastic material and, in the illustrated embodiment, is made from the same, "softer" material as the upper panel 204, as previously described, but they can also be made from the "harder" material as the lower panel 202, or any other appropriate material.

Figure 10:
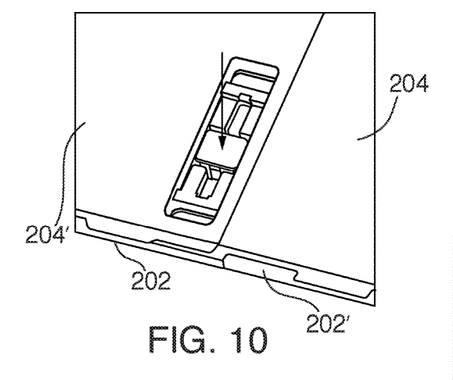
FIGS. 10-13 represent partial assembly steps for securing bed liner panels in accordance with the disclosure.
Figure 11:
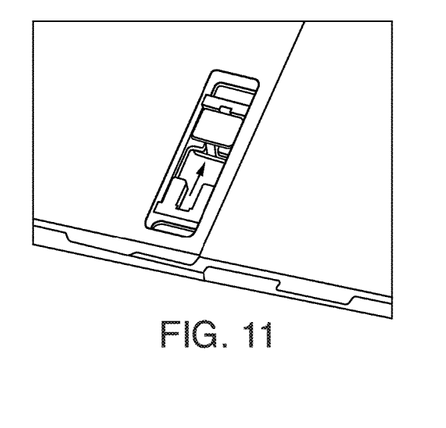

An assembly sequence for engaging adjacent panels in the liner system 112 is shown in FIGS. 10-13. In FIG. 10, two adjacent lower panels 202 (on the left side, as illustrated) and 202' (on the right side, as illustrated) are placed adjacent to one another on the bed of a machine, and are secured thereto by appropriate methods such as fasteners or, as in the illustrated embodiment, by use of a relatively elastic adhesive that can withstand low and high temperatures. In one contemplated embodiment, an intermediate layer such as fabric may be molded into the bottom face of the bottom panels 202, to aid adhesion of the elastic panels to the metal substrate of the bed of the machine.

After the lower panels 202 and 202' have been attached to the bed of the machine, a first upper panel 204 is placed over the lower panel 202' such that the lugs and channels interlock and the engagement arrangement features align, as shown. A second upper panel 204' is placed over the lower panel 202 and, partly, the second flange 312 of the first upper panel 204, such that the corresponding lugs and channels interlock and the features of the engagement arrangement 214 align, as shown. With the panels in place, a first block 414 is inserted through the central opening 402 (FIG. 10) and pushed (FIG. 11) such that the ledges 408 are engaged between the top and bottom flanges 418 and 420 and the web 422 occupies the central slot 404. In this orientation, the block 414 is oriented such that the protrusion 424 points towards and extends into the central opening 402. In the illustrated embodiment, the distance between the two flanges on the block is sufficient for a snug fit, but in an alternative embodiment the dimensions may be selected to be slightly less than the overall thickness of the flanges in the three layers to provide a pinching as the block is inserted that holds the panels securely together.

Figure 12:
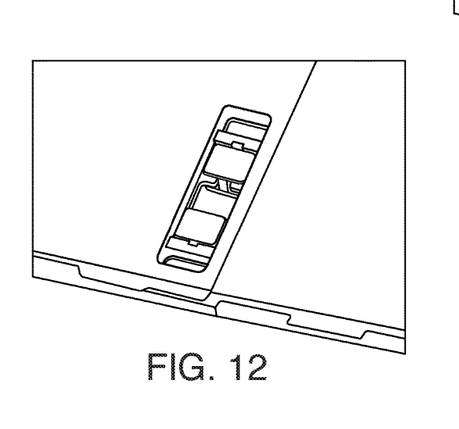
Figure 13:
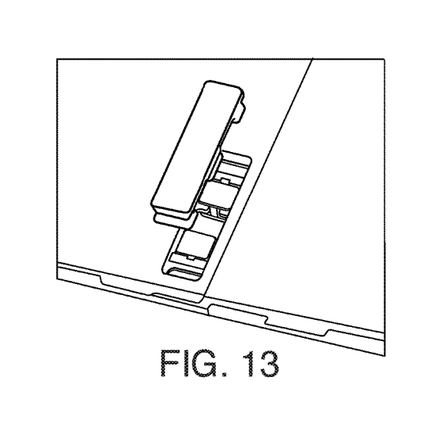

A second block 414 is inserted and pushed in a similar fashion into the second central slot 404, as shown in FIG. 12. To secure the blocks 414, a pad is inserted over the assembly, as shown in FIG. 13, such that the top shelf 430 occupies the well 410, the central leg 432 occupies the central opening 402, and each of the end legs 434 occupies the tapered openings 412, as shown in FIGS. 14 and 15. To seat the pad 426, a rubber mallet can be used to push the pad downwardly while also deforming the interfering structures elastically until the pad is fully seated and the top surface of the top shelf 430 is coplanar with the top surface 308 of the second upper panel 204'. For removing the various components maintaining engagement of the panels during replacement of damaged upper panels with new ones, the assembly sequence can be carried out in reverse.

Figure 16:
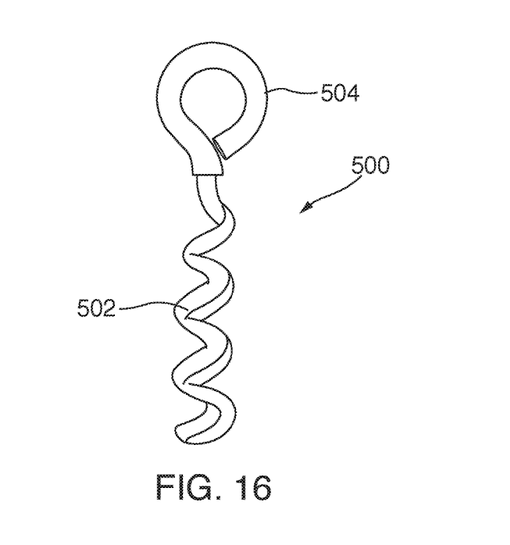
FIG. 16 is a removal key in accordance with the disclosure.
Figure 17:
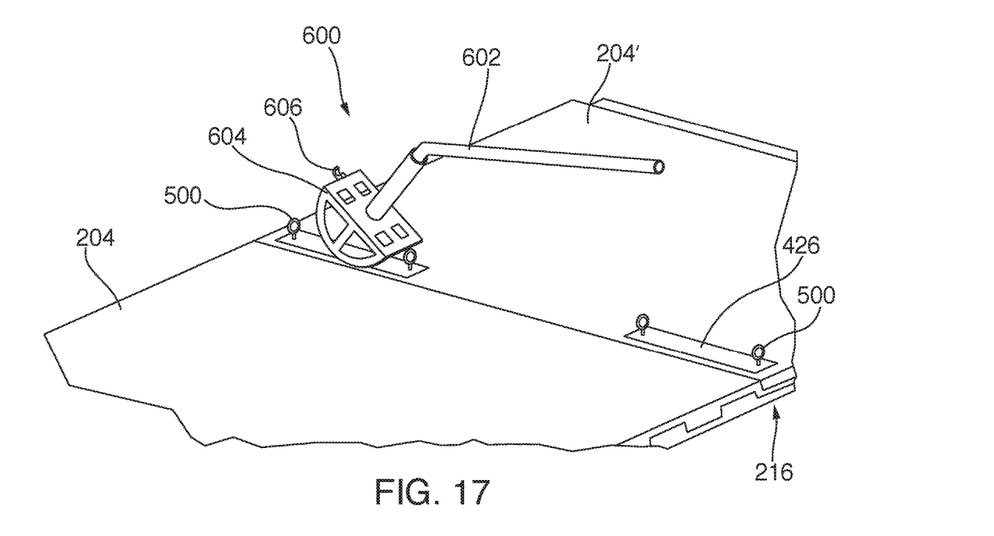
FIG. 17 is a view of a removal tool during use in accordance with the disclosure.

For removing the pad 426 during disassembly, one possible embodiment for a retracting system and method is shown in FIGS. 16 and 17. An extractor pin 500 is shown in FIG. 16. The extractor pin 500 includes a threaded section 502, which is shown having coarse threads similar to a corkscrew, or any other coarse screw type, and an eye section 504. The extractor pin 500 can be threaded into the pad 426, one through each end leg 434, as shown in FIG. 17 so that the pad can be pulled from the well 410. The extractor pin 500 can be inserted directly into the pad 426 or into a pilot hole that was previously drilled into the pad. For pulling the pad, a tool 600 can be used, as shown in FIG. 17. The tool includes a handle 602 connected to a semi-circular head 604. The head includes hooks 606 that can engage the eye 504 of a corresponding extractor pin 500 such that, as the tool 600 is rotated, a force urging the extractor pin 500 away from the corresponding second upper panel 204' can be applied to elastically deform the pad material enough to pull the pad from its engagement with the surrounding structures in the engagement arrangement 214.

INDUSTRIAL APPLICABILITY

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A bed liner system for use in a bed floor of a material hauling machine, the bed liner system comprising:
    at least one lower panel that is attachable to the bed floor, the at least one lower panel including a bottom plate, the bottom plate having a first flange, the first flange including a first central opening and two first central slots disposed, one each, on either side of the first central opening;
    at least one upper panel including a top plate, the top plate having a second flange, the second flange including a second central opening and two second central slots disposed, on each, on either side of the second central opening;
    a block having a top flange and a bottom flange connected by a web;
    wherein, when the at least one upper panel is engaged with the at least one lower panel, the second flange is disposed over the first flange, the first and second central openings are aligned, and the two first central slots are aligned with the two second central slots such that the block is insertable through the first and second central openings and slidable through one each of the two first and second central slots such that the web occupies one of the two first and second central slots to secure the at least one upper panel to the at least one lower panel.

2. The bed liner system of claim 1, wherein the two first central slots are collinear and extend from a middle portion of the first central opening away from each other, and wherein the two second central slots are collinear and extend from a middle portion of the second central opening away from each other.

3. The bed liner system of claim 2, further comprising a stop wall at which each of the two first and second slots terminates, and ledges disposed on either side of each central slot in the at least one upper and lower panels, the ledges extending between the corresponding central opening and the stop wall.

4. The bed liner system of claim 3, wherein, when the web of the block is engaged in the corresponding first and second central channels, the corresponding ledges are engaged between the top and bottom flanges of the block.

5. The bed liner system of claim 1, further comprising a second block disposed in the other of the two first and second central slots.

6. The bed liner system of claim 5, further comprising a pad having a central leg, the central leg being insertable in the first and second central openings and of sufficient size to engage the block and prevent sliding motion of the block into the first and second central openings when the block is disposed such that the web occupies the corresponding one of the two first and second central slots.

7. The bed liner system of claim 6, further comprising:
a first tapered opening extending through the bottom plate of the at least one lower panel, the first tapered opening having a cross sectional area that increases in a direction towards a bottom surface of the bottom plate;
a second tapered opening extending through the top plate of the at least one upper panel, the second tapered opening having a cross sectional area that decreases in a direction away from the top surface of the top plate;
wherein the first and second tapered openings are aligned when the at least one upper panel is engaged with the at least one lower panel; and
an end leg having a varying cross sectional area that matingly engages and extends through the first and second tapered openings, the end leg having an hourglass shape.

8. The bed liner system of claim 7, wherein the first and second tapered openings define a pair of tapered openings disposed on one side of the first and second central openings, and wherein the bed liner system further includes a second pair of tapered openings disposed on an opposite side of the first and second tapered openings such that a second end leg is insertable there through.

9. The bed liner system of claim 8, wherein the central leg, the end leg, and the second end leg are formed integrally with the pad, the pad further including a top shelf.

10. The bed liner system of claim 9, further comprising a well formed in the second flange, wherein the top shelf is disposed in the well such that a top surface of the top shelf is coplanar with the top surface of the top plate.

11. The bed liner system of claim 1, wherein the at least one lower panel is made from an elastic material having a first hardness, the at least one upper panel is made from an elastic material having a second hardness, and the block is made from an elastic material having a third hardness.

12. The bed liner system of claim 11, wherein the first hardness is greater than the second hardness.

13. The bed liner system of claim 11, wherein the first hardness is equal to the third hardness.

14. The bed liner system of claim 1, further comprising:
a first plurality of lugs formed on the bottom plate, the first plurality of lugs being separated by a first plurality of channels; and
a second plurality of lugs formed beneath the top plate, the second plurality of lugs being separated by a second plurality of channels;
wherein, when the at least one upper panel is disposed on the at least one lower panel, the first plurality of lugs is at least partially disposed in the second plurality of channels and the second plurality of lugs is at least partially disposed in the first plurality of channels to interlockingly engage the at least one upper panel with the at least one lower panel.

15. The bed liner system of claim 1, wherein the first and second central openings, the two first central slots, the two second central slots and the block, together, at least partially define a first engagement arrangement.

16. The bed liner system of claim 15, further comprising a second engagement arrangement.

17. The bed liner system of claim 1, wherein the at least one upper panel includes a third flange disposed at an offset relative to the second flange and the top plate, the third flange being engageable between corresponding first and second flanges of an adjacent upper panel and an adjacent lower panel in the bed liner system.

18. The bed liner system of claim 17, wherein the third flange forms a third central opening at two third central slots, the third central opening and two third central slots being aligned with corresponding first and second central openings and two first and second central slots in the adjacent upper and lower panels such that a corresponding block connecting the adjacent upper and lower panels passes through the third central opening and occupies one of the two first and second central slots.

19. The bed liner system of claim 18, wherein the at least one lower panel and the adjacent lower panel abut one another without overlapping structures.

20. The bed liner system of claim 1, further comprising a protrusion formed on the web of the block, the protrusion disposed within a combined opening of the first and second central openings.

* * * * *